Dec. 29, 1953

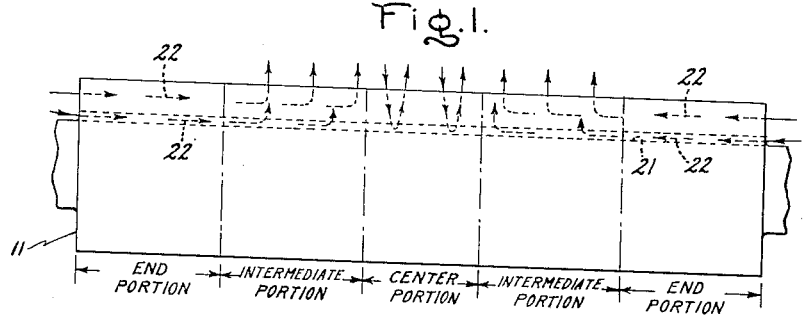
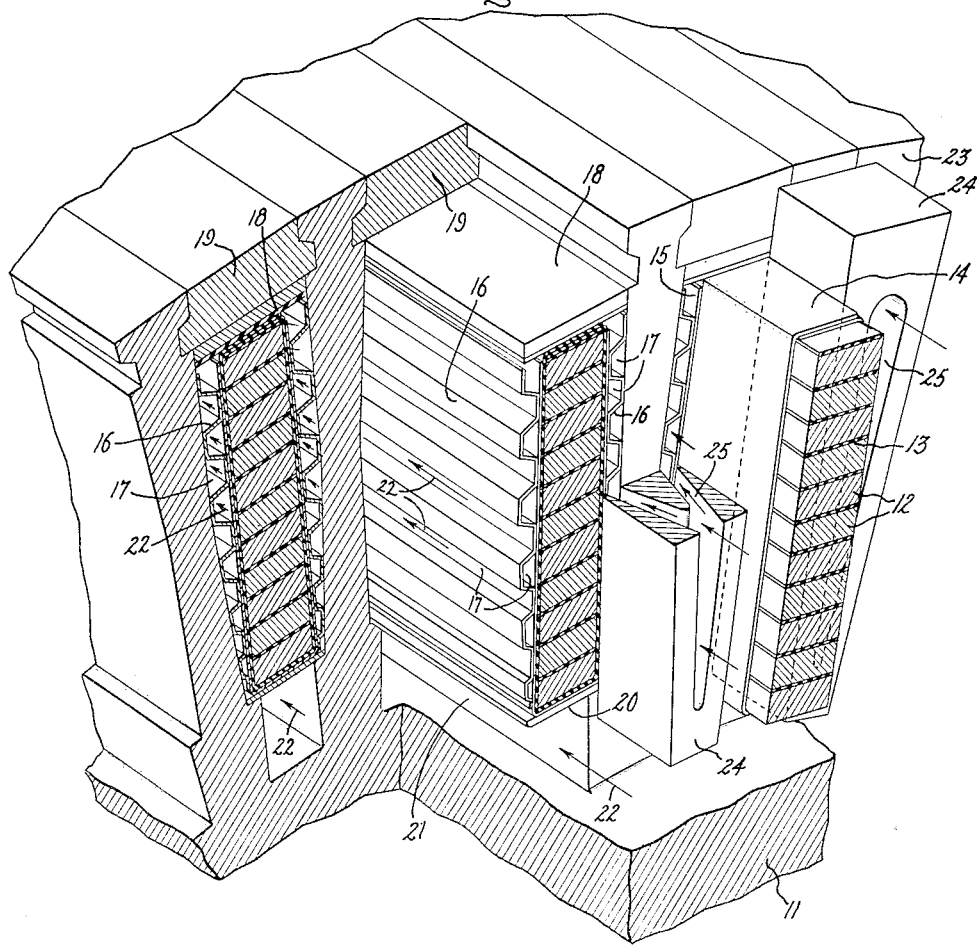

E. D. HUNTLEY 2,664,512

DYNAMOELECTRIC MACHINE CORE AND WINDING
VENTILATION ARRANGEMENT

Filed Aug. 30, 1952

Inventor:
Edson D. Huntley.

by Richard E. Hosley
His Attorney.

Dec. 29, 1953
E. D. HUNTLEY
2,664,512
DYNAMOELECTRIC MACHINE CORE AND WINDING
VENTILATION ARRANGEMENT
Filed Aug. 30, 1952
3 Sheets-Sheet 3
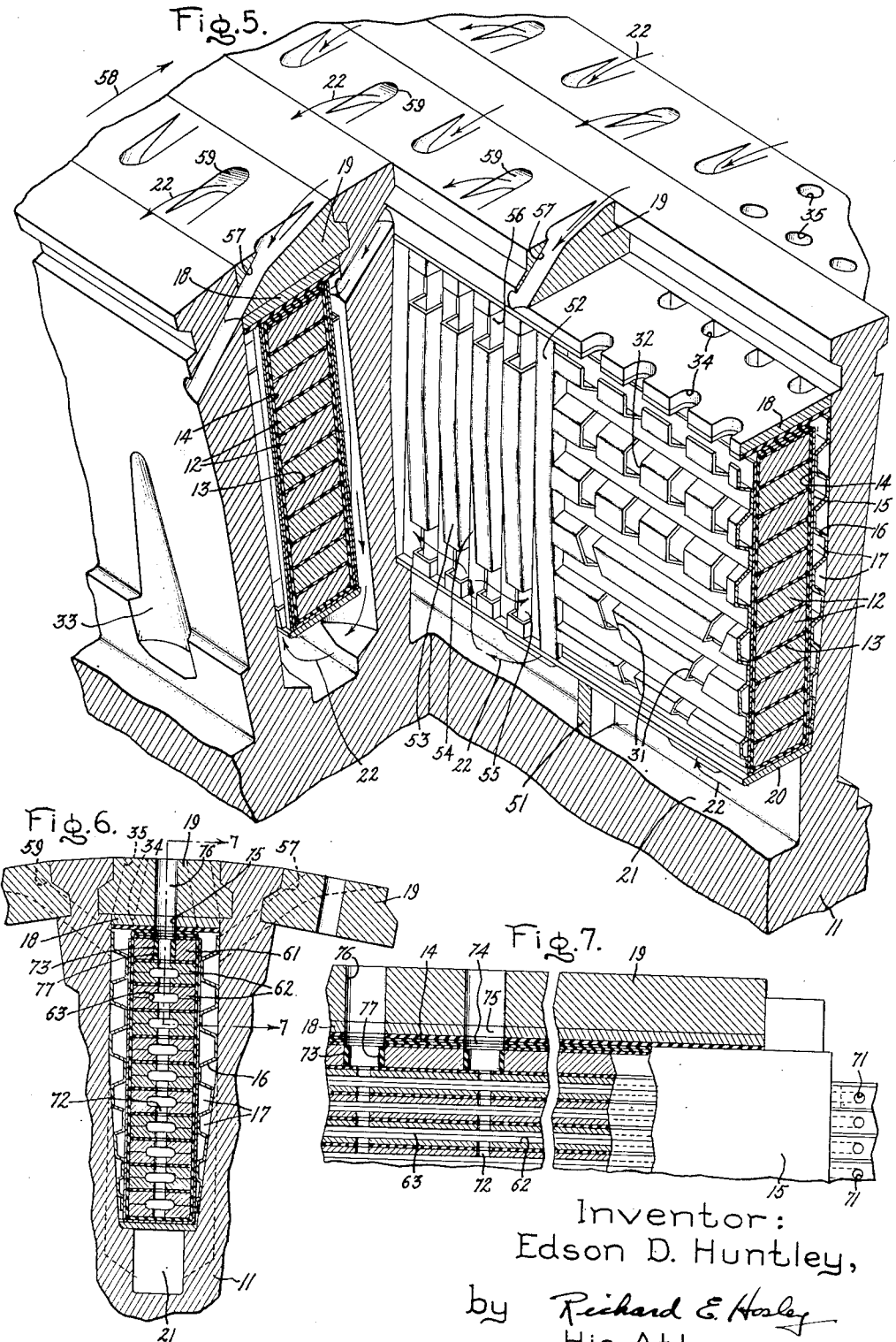
Inventor:
Edson D. Huntley,
by Richard E. Hosley
His Attorney.

Patented Dec. 29, 1953

2,664,512

UNITED STATES PATENT OFFICE 2,664,512

DYNAMOELECTRIC MACHINE CORE AND WINDING VENTILATION ARRANGEMENT

Edson D. Huntley, Scotia, N. Y., assignor to General Electric Company, a corporation of New York Application August 30, 1952, Serial No. 307,185

3 Claims. (Cl. 310—64)

My invention relates to dynamoelectric machines and has particular significance in connection with improvements in ventilating arrangements for windings in slotted rotor core members of large turbine generators.

Conventionally, generators adapted to be driven by steam turbines to supply large amounts of power each have a stationary outer core member having slots containing an armature winding adapted to provide A.-C. output when excitation is provided by a rotor core member having slots containing a field exciting winding energized by direct current. The longer the cores and the windings, the more difficult it is to force the requisite cooling gas toward the innermost portions of the embedded windings, and one of the principal limiting factors affecting the output of such large machines is the temperature rise of the copper conductors making up the several windings.

It is an object of the present invention to provide simple and inexpensive means for overcoming the above-mentioned difficulty.

A further object of the present invention is to provide improved ventilation and heat dissipation means for use in a dynamoelectric machine core member to increase the rating of a machine of given dimensions or, alternatively, decrease the required dimensions for a machine of the same rating.

In the past, turbine generator rotors of large size have been provided with ventilating ducts or slots located in the tooth portions of the rotor body, midway between winding slots, but as the size of turbine generators is growing rapidly, more adequate means of removing the field conductor loss is required to meet the temperature rises set by today's standards.

Briefly stated, in accordance with one aspect of my invention a turbine generator rotor is provided with winding slots having elements of a winding therein with slot insulation around the winding element within each slot, and with the slot insulation surrounded by a metal sheath intimately bonded thereto and having corrugated metallic convectors bonded to the sheath and interposed between the slot insulation sheath and the walls of the slot to provide ventilating passages, large cooling surfaces, and high heat conductivity for transfer of the loss generated in the field conductors. In a modification, the individual winding elements comprise superposed hollow conductor bars, and cooling medium access is had to the hollow conductors at the ends of the rotor body. The cooling medium flows axially inward toward the center through the passages defined outside the slot insulation by the corrugated metallic convectors (with a parallel flow through the hollow conductors where provided) and exits to the air gap at various locations toward the center of the machine.

The features of my invention which are believed to be novel are set forth with particularity in the appended claims. My invention itself, however, both as to its organization and method of operation, together with further objects and advantages thereof, may best be understood by reference to the following description taken in connection with the accompanying drawing, having various figures as follows:

Fig. 1 is a simplified diagrammatic elevation of a turbine generator rotor and indicates the flow of cooling medium associated with a single winding slot through various axial portions of the machine as indicated by two end portions, a center portion and two intermediate portions;

Fig. 2 is a perspective view of the right-hand end axial portion of Fig. 1, partially broken away;

Fig. 5 is a progressively broken-away section through the axial center portion and the right-hand intermediate portion of Fig. 1;

Fig. 6 is a cross-sectional view showing a modification in which hollow conductors are provided for additional cooling;

Fig. 7 is a longitudinal section taken on the line 7—7 of Fig 6.

Figure 3:
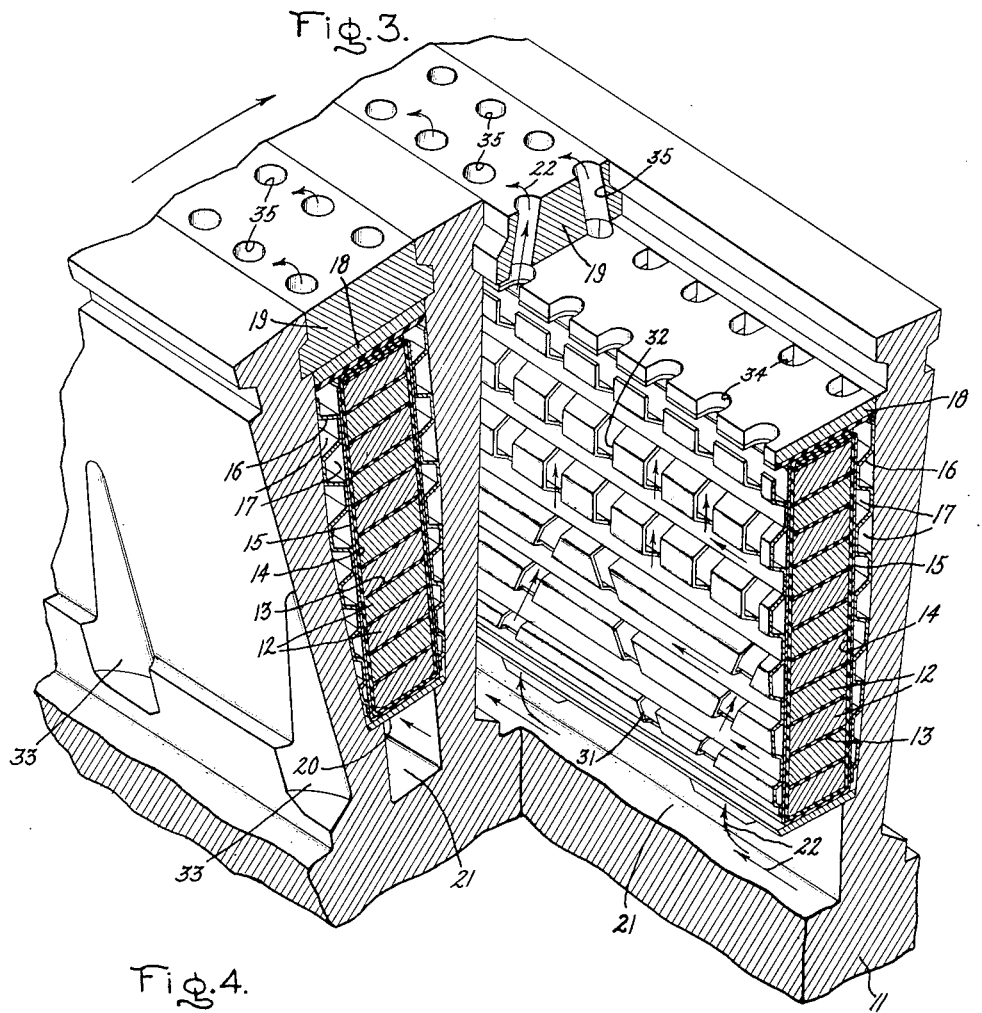
Fig. 3 is a progressively broken-away section through the right-hand intermediate axial portion of Fig. 1.

Referring now to the drawings, I have shown my invention in connection with a large turbine generator rotor comprising an annular ferritic core 11 which may be a large forging well over ten feet in length and three feet in diameter. The rotor is provided with axially extending winding slots containing the elements of a rotor or field winding and, in the illustrated embodiments of Figs. 2–5, the winding element in each slot comprises a plurality of superposed solid conductor bars 12. Adjacent conductor bars are separated by relatively small turn insulation 13, and in each slot the entire assembly of superposed bars 12 and intervening turn insulation 13 is surrounded by slot or ground insulation 14 which is continuous around the sides, bottoms and tops of the winding element. In accordance with the present invention, a metallic sheath 15 is intimately bonded to the insulation, and on each side of the assembly a corrugated metallic convector 16 is intimately secured to the sheath. Each winding slot is just wide enough to accommodate winding element plus insulation plus sheath and convectors. The intimate bonds may be accomplished in various ways, for example, varnish may be applied between sheath and insulation and any voids squeezed out in a press, and the metallic convectors may be bonded to the sheath at continuous points by brazing, soldering, welding or the like, depending upon the types of metals used for each of these several parts. The arrangement described provides mechanical support for the winding element sideways and also large cooling surfaces and high heat conductivity adjacent axially extending longitudinal gas passages 17 provided by the half-honeycomb shape of the metallic convectors. Above the insulated winding element in each slot, there is provided a metallic spacer 18 (which may serve as a damper winding) and a more or less conventional slot wedge 19. Below the insulated winding element, there is (if desired) provided a spacer 20 beneath which the winding slot is narrowed to provide a ventilating sub-slot 21 beneath the winding-occupied portion of the slot. A ventilating gas, such as hydrogen, is forced by appropriate fan means (not shown) at the ends of the rotor body into the longitudinal passages 17 provided by the honeycomb convectors and, also, with the illustrated arrangement, into each sub-slot 21, as indicated by the arrows 22.

It is conventional in ventilating arrangements for large turbine generators to have axial zones or portions with the cooling medium flowing in a different manner in the different zones. As indicated in Fig. 1, there are two end portions in which the ventilating medium flow is similar (except opposite hand), and there is a center portion which most of the coolant introduced into the end portions does not reach at all and which is cooled by "air gap" gas going into and out of this center portion from and to the rotor periphery at the air gap, and there are also two intermediate portions in which the circulation is similar (except opposite hand) with the ventilating medium reaching these intermediate portions through the sub-slots and through the longitudinal passages provided by the honeycomb grids, and then exhausting radially outward to the periphery of the rotor at the so-called air gap. This flow of ventilating medium different in the various zones may be more clear from reference to Figs. 2–5. As already indicated, Fig. 2 is representative of the right-end portion, Fig. 3 is a view of an intermediate portion, and Fig. 5 is a view showing both the center portion and the right-hand intermediate portion of Fig. 1.

As seen in Fig. 2 showing a portion of one end, at each end of the rotor the insulated assembly of superposed conductor bars 12 protrudes axially for a distance beyond the sheath 15 and convectors 16, and at the ends 23 of the core tooth portions between each pair of these protruding insulated assemblies there are located slotted blocks 24 slotted to provide bifurcating gas passages 25 communicating with the ends of the longitudinal passages 17 formed by the convectors. Thus, the slotted blocks facilitate the flow of ventilating medium from the respective ends of the rotor into all of the passages 17 at the respective sides of the respective slots.

In Fig. 3, showing part of the right-hand intermediate axial portion of the rotor, like parts are like numbered as in Fig. 2. In the intermediate zones, the cooling medium not only travels axially from the associated end portion through the axial passages 17 of the honeycomb convectors but also travels radially as indicated in Figs. 1 and 3, and to this end the honeycomb convectors are cut out to provide slanting passages 31 and radial passages 32, the radial passages 32 being provided in uppermost tiers of the corrugations of the half honeycomb, and the slanting passages 31 being provided in the lowermost tier. In order to provide a greater "scrubbing" effect of the coolant adjacent the hotter lowermost conductor bars and to provide for increased radial flow in the upper tiers where this exit flow comprises gas from both lower and upper longitudinal passages, the slanting passages 31 are fewer in number than the upper radial passages 32.

In each of the arrangements shown in Figs. 2–7, the slot side walls are tapered and the convectors are narrower at bottom than at top so that even with the cross section of each assembly of superposed conductor bars rectangular, approximately uniform tooth width is preserved between slots. To reinforce the flow of ventilating medium in each intermediate axial zone (of which the right-hand one is shown in Fig. 3), the sub-slots 21 are tapped at axially spaced intervals by radially extending arcuate openings 33 provided in lowermost sides of the tapered side walls of each slot and establishing communication between each sub-slot 21 and the slanting passages 31 located in the convector tiers thereabove. The radial passages 32 provided in the upper tiers are caused to intercommunicate through holes 34 provided in the top spacer 18 and through holes 35 bored in the slot wedges to provide communication between the associated axial and radial passages to the air gap at the periphery of the rotor so that the coolant flow in each intermediate portion is both axially from the associated end portions through the half-honeycomb axial passages and also radially both from these passages and from the sub-slot through the arcuate openings 33, and radially outward through the passages 31 and 32 provided in the convectors and through the holes 34 and 35 in the top spacers and wedges.

Figure 4:
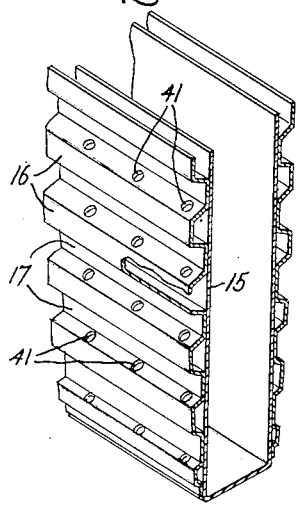
Fig. 4 is a fragmentary view of a corrugated metallic grid convector showing a modification of the convectors shown in Figs. 2 and 3.

Differently directed passages (such as 31—32 as compared with passages 17) may be readily provided by taking flat metal sheets with perforations therethrough (to ultimately provide passages 31—32) and then waving such sheets to provide the axial passages simultaneously with the convector corrugations and longitudinal passages 17. I do not mean to limit the present invention to an arrangement so provided for obviously the same result could be achieved by welding small sheet metal boxes directly to the sheet metal sheath or armor, or, as illustrated in Fig. 4, each convector may be corrugated with uniform openings 41 in the top and bottom sides of each tier without any openings in the interspaced vertically extending portions.

Referring now to Fig. 5 in which like parts are like numbered as in the other figures, I have shown both the center axial portion (at the left in the figure) and the right-hand intermediate portion (at the right in the figure). It will be seen that between the two zones or portions there is a barrier 51 in the sub-slot 21 (beneath each winding slot), and there is a barrier 52 sealing off the axial passages 17 on each side of the conductor bar assembly in each slot. In the center zone, convector corrugations 53 extend transversely (compared to convector corrugations in the other zones) so that radial passages 54 are provided extending on each side of the winding assembly in each slot and the corrugations are cut away adjacent top and bottom to provide bottom longitudinal passages 55 and top longitudinal passages 56. Again the arcuate openings 33 are provided in the bottoms of the tapered slot side walls, and in the center zone these openings communicate with the longitudinal passages 55 between the radial convector passages 54. In the center zone, the flow of ventilating medium through about half of the radial arcuate openings 33 in the slot side walls is reversed from that in the intermediate zones, as hereafter more fully explained. At the top of each convector, some of the radial passages 54 (interconnected with others by longitudinal passages 56) at one side of the insulated conductor bar assembly communicate with diagonal inlet passages 57 provided in the tooth portions of core 11 and through the wedges 19 to scoop up "air gap" ventilating medium with rotation of the rotor in the direction for which it is designed, as indicated by arrow 58. Diagonal exit passages 59 through teeth and core communicate between air gap and passages 54—56 at the opposite sides of the slots, and the flow of ventilating medium may be traced from the air gap periphery of the rotor core in through the diagonal entry passages 57, down through the associated ones of the radial passages 54, as indicated by appropriate ones of the arrows 22, through the nearest arcuate opening 33 into the sub-slot 21, across and along the sub-slot to another arcuate opening 33 and therethrough to other radial passages 54, and upward to an exit passage 59 through the tooth portion and wedge to the air gap.

In Figs. 6 and 7, the arrangement differs from the arrangements previously described in that hollow conductors are provided. Although in each slot a substantially solid top conductor 61 is provided, the other conductors 62 may be regarded as each a hollow single conductor or as two channel sections face to face to form a single conductor. In either event, the bars have axially extending center passages 63. In accordance with the arrangements already described, the rotor core is provided with winding slots having tapered walls, and arcuate openings 33 are drilled in these walls in the center and intermediate portions to communicate between sub-slots 21 and the radial and axial passages defined by the openings in end convolutions of the convector 16 (or 53) on each side of the winding element in each slot. As before, at the top of each slot, communication is provided between these convector passages in the intermediate zones by exit passages 34—35 through spacer and wedge, and in the center zone by diagonal inlets 57 and outlets 59 through core and wedges. At the end of the rotor, the bare or insulated conductor bars extend outside the slot insulation armor 15 and convectors 16; and, as shown in Fig. 7, these bars are tapped by sidewise holes 71 at these end portions, so that the cooling gas distributed by the fan means will enter into the axial passages 63 provided in the conductor bars and pass toward the center of the rotor. In the intermediate zones and in the center zone, communication is established between the various axial passages 63 by radial openings 72 which in turn communicate with larger radial openings 73 provided through the top conductor bar in each slot and through the slot insulation 14 (holes 74) and the spacer or amortisseur strip 18 (holes 75) and through the slot wedges 19 (holes 76) to the air gap. In connection with Figs. 6 and 7, it is of course assumed that adjacent the sidewise holes 71 the insulation is tapped if there provided, and adjacent the radial holes 72 the strand insulation 13 is tapped between the various conductors. An insulation collar 77 may be placed in each radial hole 73 in each otherwise solid top conductor to provide suitable creepage distance of ground insulation at the exit holes.

With either the arrangement of Figs. 1-5 or 6-7, compared to conventional practices (such as provision of axial slots in the teeth), relatively small cross-sectional areas are available for the flow of cooling medium by relatively greater hydrogen pressures such as 50 pounds per square inch gauge, or even 75 p. s. i. g., can be used in order that the mass flow of ventilating medium can be increased to offset the decrease in cross section. With the arrangement of the invention, the axial ventilation slots conventionally milled in the center of the rotor teeth to provide axial ventilating passages intermediate the winding slots are no longer required, thus releasing a considerable amount of magnetic core material which is utilized only in part, in accordance with the present invention, by moving the axial ventilation slots adjacent the field conductors because of the more efficient heat transfer and because the conductors always run hotter than the core.

There is thus provided a device of the character described capable of meeting the objects hereinabove set forth. With the winding elements in each slot surrounded by armored insulation to which honeycomb-like metallic convectors are intimately secured, there is ready access for cooling medium to flow axially with or without the added feature of hollow or grooved conductors. Exits to the gap at various locations utilize the maximum available centrifugal pressures and, in accordance with one aspect of the invention, end and intermediate sections may be readily fed by cooling gas taken in at the end 5 (which are points of highest pressure) and flowing axially through the end sections and then both axially and radially through the intermediate sections and discharging to the gap with heat being taken by the cooling medium from the core steel adjacent the ventilating passages as well as from the metallic armor and honeycomb convector surfaces. In the more remote center section, the cooling medium is shown taken from the gap through holes drilled at an angle through rotor wedge and tooth, then flowing radially inward through a honeycomb at one side of the winding slot to the sub-slot, across the sub-slot, and radially outward through an opposite honeycomb to a discharge opening through tooth and wedge to the gap, with the flow being caused by differential pressure set up by impact on the entrance hole and velocity exit at the discharge hole with rotation of the rotor so that it is possible to construct a high speed machine of very large rating because the length becomes of little consequence as compared with present practices.

While I have illustrated and described particular embodiments of my invention, various modifications will obviously occur to those skilled in the art. I desire it to be understood, therefore, that my invention is not to be limited to the particular arrangements disclosed, and I intend in the appended claims to cover all modifica-

What I claim as new and desire to secure by Letters Patent of the United States is:

1. In a dynamoelectric machine core member having winding slots provided with insulated winding elements, the combination of a metallic sheath intimately bonded to the side surfaces of the insulation of the winding element in each slot, a corrugated metallic convector disposed at each side of the winding element in each slot and having portions intimately bonded to a side surface portion of said sheath, each convector coöperating with the slot side walls and said sheath to provide ventilating passages, and means for forcing a ventilating medium through said passages.

2. A ventilating arrangement as in claim 1 further characterized by sub-slots axially extending through the rotor core and located one beneath each winding slot, with said arrangement being characterized by five axial zones of the rotor comprising two end zones, a center zone and two intermediate zones, means including slot wedges for closing the winding slots at the periphery of the rotor above the conductor bars, axially spaced substantially radially extending passages through the convectors in said center and intermediate zones, axially spaced passages through the slot wedges to establish communication between the convector passages and the rotor periphery in said center and intermediate zones, axially spaced radially extending arcuate openings in the slot walls to establish communication between the sub-slots and the convector passages in said intermediate and center zones, barrier means blocking the sub-slots and convector passages between center and intermediate zones, means for introducing a ventilating medium at each end of the rotor into the sub-slots and into the ventilating passages provided by said convectors in each end zone so that the flow of cooling medium will be axially inward through the end zones, axially inward and radially outward through sub-slots and convector passages in the intermediate zones, and radially inward and radially outward in the center zone.

3. In a dynamoelectric machine annular rotor core having axially extending winding slots defining teeth therebetween, and in each slot an insulated winding element comprising superposed solid conductor bars, a metallic armor surrounding said insulated winding element, a corrugated metallic convector on each side of said armor, with the convectors forming ventilating passages which run axially only in end portions of the rotor core, axially, radially and slantwise in intermediate portions of the rotor core, and radially and axially in a center portion of the rotor core, means including blocks having bifurcated passages for introducing cooling medium into the axial passages in the end zones at the ends of said rotor core, means including slot wedges having in the intermediate zones substantially radial passages therethrough communicating with the rotor core periphery and with the radial passages in the convectors in said zones, diagonal passages through slot wedges and teeth in the center zone and communicating with convectors and constructed and arranged to act as inlet and outlet passages with rotation of said rotor.

EDSON D. HUNTLEY.

References Cited in the file of this patent

UNITED STATES PATENTS

| Number | Name | Date |
|---|---|---|
| 1,884,573 | Chapman | Oct. 25, 1932 |
| 2,221,567 | Baudry | Nov. 12, 1940 |

FOREIGN PATENTS

| Number | Country | Date |
|---|---|---|
| 21,822 | Great Britain | of 1912 |
| 96,244 | Switzerland | Sept. 16, 1922 |
| 534,252 | Great Britain | Mar. 3, 1941 |
| 654,087 | Germany | Dec. 10, 1937 |
| 666,851 | France | May 28, 1929 |